(12) United States Patent
Hegger et al.

(10) Patent No.: US 11,519,928 B2
(45) Date of Patent: Dec. 6, 2022

(54) RADIO SENSOR MODULE FOR DETECTING MATERIAL CONTAINERS

(71) Applicant: STEUTE TECHNOLOGIES GMBH & CO. KG, Löhne (DE)

(72) Inventors: Christof Hegger, Porta Westfalica (DE); Gabriel Bowering, Bad Oeynhausen (DE); Carsten Both, Minden (DE)

(73) Assignee: STEUTE TECHNOLOGIES GMBH & CO. KG, Löhne (DE)

( * ) Notice: Subject to any disclaimer, the term of this patent is extended or adjusted under 35 U.S.C. 154(b) by 679 days.

(21) Appl. No.: 16/496,718

(22) PCT Filed: Jun. 8, 2018

(86) PCT No.: PCT/EP2018/065149
§ 371 (c)(1),
(2) Date: Sep. 23, 2019

(87) PCT Pub. No.: WO2018/224646
PCT Pub. Date: Dec. 13, 2018

(65) Prior Publication Data
US 2020/0386781 A1 Dec. 10, 2020

(30) Foreign Application Priority Data

Jun. 8, 2017 (DE) ...................... 20 2017 103 459.3

(51) Int. Cl.
*G01P 1/07* (2006.01)
*G01P 15/08* (2006.01)
(Continued)

(52) U.S. Cl.
CPC ................ *G01P 1/07* (2013.01); *G01P 15/08* (2013.01); *G08C 17/02* (2013.01); *B65G 13/00* (2013.01);
(Continued)

(58) Field of Classification Search
None
See application file for complete search history.

(56) References Cited

U.S. PATENT DOCUMENTS

2013/0055973 A1* 3/2013 D'Epiro .............. F01L 13/0026
123/90.11
2013/0139747 A1* 6/2013 Winkler ................... B65G 9/00
116/200
(Continued)

FOREIGN PATENT DOCUMENTS

CN 201336655 Y 10/2009
CN 203638648 U 6/2014
(Continued)

OTHER PUBLICATIONS

International Search Report dated Aug. 29, 2018 in related/corresponding International Application No. PCT/EP2018/065149.
(Continued)

*Primary Examiner* — John F Mortell
(74) *Attorney, Agent, or Firm* — Patent Portfolio Builders PLLC

(57) ABSTRACT

A radio sensor module for detecting material containers in a storage or transport system includes a transmission device for the wireless transmission of signals. The radio sensor module has a holder and a rocker pivotably mounted therein. A sensor for detecting a position of the rocker and the transmission device are arranged in the rocker.

11 Claims, 4 Drawing Sheets

(51) Int. Cl.
*G08C 17/02* (2006.01)
*B65G 13/00* (2006.01)
*B65G 21/20* (2006.01)

(52) U.S. Cl.
CPC ...... *B65G 21/2054* (2013.01); *B65G 21/2072* (2013.01); *B65G 2203/0208* (2013.01); *B65G 2203/042* (2013.01)

(56) References Cited

U.S. PATENT DOCUMENTS

2017/0081993 A1\* 3/2017 Zurface ............... F01L 1/22
2017/0183982 A1\* 6/2017 Hughes ............... F01L 1/267
2017/0342866 A1\* 11/2017 McCarthy, Jr. ......... F01L 1/22

FOREIGN PATENT DOCUMENTS

| CN | 104528323 A | 4/2015 |
|---|---|---|
| CN | 205002878 U | 1/2016 |
| CN | 205346165 U | 6/2016 |
| CN | 206142385 U | 5/2017 |
| DE | 202007012926 U1 | 2/2008 |
| DE | 102010050035 A1 | 5/2012 |
| DE | 102011119410 A1 | 5/2013 |
| EP | 0773443 A1 | 5/1997 |
| EP | 2930487 A1 | 10/2015 |

OTHER PUBLICATIONS

Written Opinion dated Aug. 29, 2018 in related/corresponding International Application No. PCT/EP2018/065149.
Office Action dated Jan. 15, 2021 in related/corresponding CN Application No. 201880007496.1.
Office Action dated Sep. 3, 2021 in related/corresponding CN Application No. 201880007496.1.

\* cited by examiner

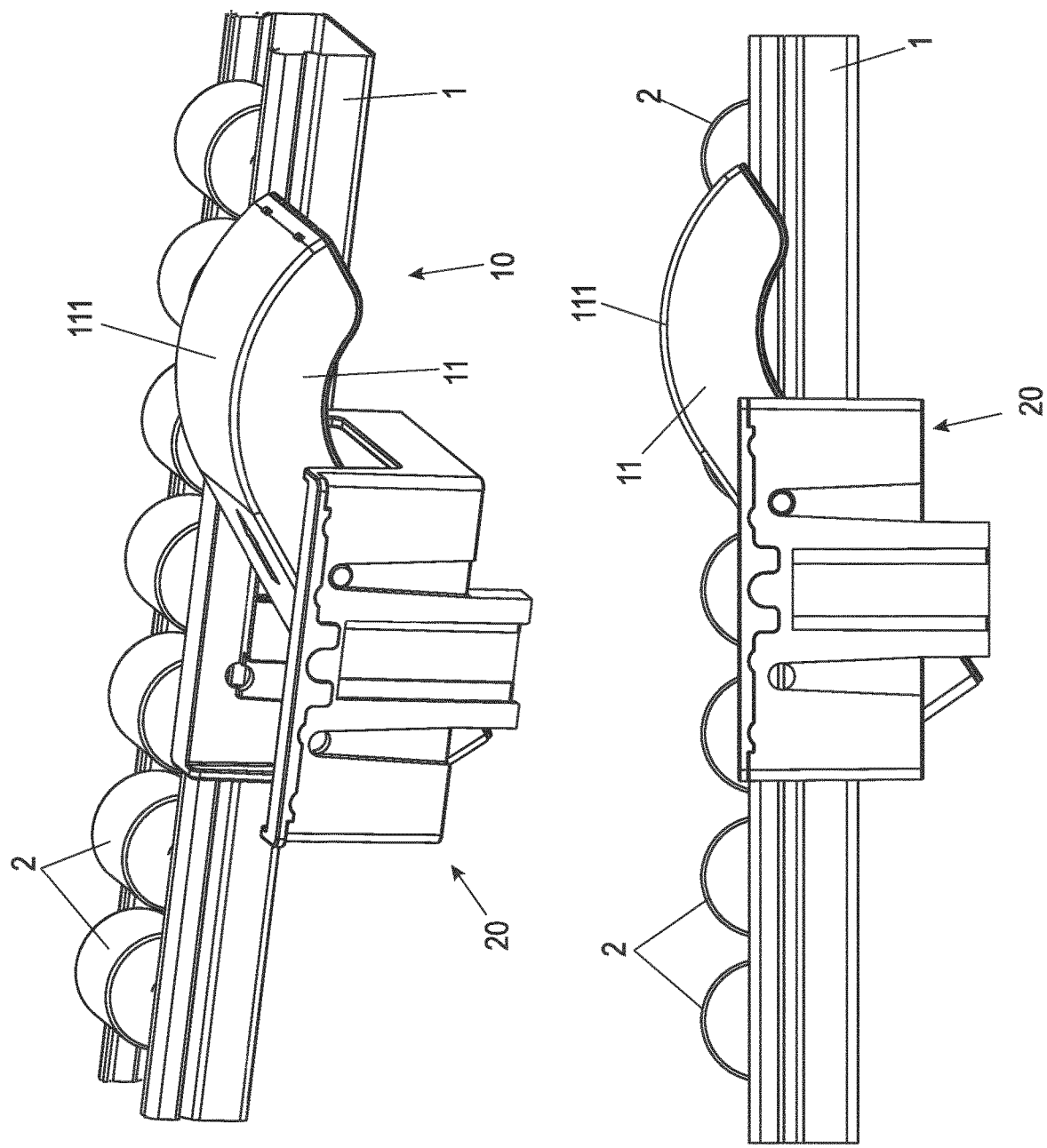

RADIO SENSOR MODULE FOR DETECTING MATERIAL CONTAINERS

BACKGROUND AND SUMMARY OF THE INVENTION

Exemplary embodiments of the invention relate to a radio sensor module for detecting material containers in a storage or transport system, having a transmission device for wireless signal transmission.

In modern production plants as well as in logistics, storage or transport systems are used for material containers in which a material transport or material stock is recorded and monitored as automatically as possible. Such storage or transport systems include rack arrangements, as well as conveyor belts that are used to feed or remove material containers, for example to dispatch, process or store material. In the context of the registration, a "material container" means boxes for holding piece goods or bulk goods as well as trays, pallets or the like.

A radio sensor module for the detection of material containers in a storage or transport system is known for example from the printed publication EP 2 930 487 A1. The disclosed sensor module has a force transducer that measures the presence or magnitude of a weight force of a material container and transmits a signal representing the measured weight force via a transmission device to a central control unit. The transmission of information via radio instead of a cable connection simplifies installation or retrofitting or reconfiguration of existing systems. The measurement of the weight force makes it possible not only to detect the presence of a material container but also to make statements about the loading condition of the container. However, an arrangement of the radio sensor module in the storage or transport system, which makes it possible to measure the weight force, is complex and cannot be implemented or is not required in all storage and transport systems.

In addition to measuring the weight force, sensors designed as switches are also known. The printed publication DE 20 2007 012 926 U1 describes a switch arrangement in which a rocker mounted in a holder is arranged in such a way that it is pivoted by an appropriately positioned material container. The rocker is mechanically coupled to an actuating element of a switch mounted on the holder, which is actuated when the rocker pivots. The rocker thus represents a probe head of the arrangement.

In order to achieve a long service life with many actuation cycles with such a mechanically actuated switch, a mechanically solid design of the switch is required, which makes such a sensor module complex and costly in production. In addition, the coupling of the rocker with the switch can prove to be a weak point that limits the maximum number of actuation cycles. Due to the coupling with the switch, the arrangement usually also has a fixed switching point, i.e., at a certain angular position of the rocker it is switched relative to its holder. In certain mounting positions of the holder, however, other angular positions may be required for the switching points, which in the known system can only be achieved by individual adaptations of the holder or the mechanical coupling between rocker and switch.

Alternatively, sensor modules are known that detect material containers without contact, for example inductively or optically. Inductive detection requires metallic material containers. Optical detection is sensitive to ambient light. By using modulated light, the sensitivity to ambient light can be reduced, but this is complex. In addition, optical systems are susceptible to contamination.

Exemplary embodiments of the present invention are directed to a mechanically simple and cost-effective radio sensor module of the type mentioned above, which works reliably and interference-free and which is able to detect material containers as simply as possible and without a complex setting of the switching point.

A radio sensor module of the type mentioned above and in accordance with the invention is characterized in that it has a holder and a rocker pivotably mounted therein, wherein a sensor for detecting a position of the rocker and the transmission device is arranged in the rocker.

In this way, all the mechanical, electromechanical, electrical and/or electronic components used to detect the movement of the rocker and to transmit the information on the movement of the rocker are located in or on the rocker itself. In this way a very simple system is created in which—apart from the rocker being mounted in the holder—no mechanical connection between the rocker and the holder is necessary.

In an advantageous embodiment of the radio sensor module, the sensor is an acceleration sensor, in particular a MEMS (micro-electromechanical system) sensor. With the help of the acceleration sensor, a position and/or change in position of the rocker can be detected without any mechanical coupling of the rocker with the environment. In its embodiment as a MEMS sensor, the acceleration sensor is space-saving and also available at a reasonable price. Such MEMS acceleration sensors are widely installed in mobile devices such as smartphones or tablet computers and are cost-effective due to the large number of such devices.

The transmission device of the radio sensor module is preferably set up to transmit acceleration values measured by the acceleration sensor in at least one spatial direction. The measured values of the acceleration sensor are then evaluated, for example, in the area of the receiver of the transmitted signals and thus at a central location. This is particularly advantageous when a large number of radio sensor modules are coupled to a central evaluation unit. The large number of wireless sensors does not require their own evaluation logic, which reduces their construction and manufacturing costs.

Alternatively, or additionally, an evaluation unit can be arranged in the rocker, which is set up to evaluate the acceleration values measured by the acceleration sensor. In this way, the radio sensor module can immediately transmit a switching position of the rocker, ensuring compatibility with existing systems. For this purpose, for example, the evaluation unit is connected to the transmission unit and transmits information about a position and/or a change in position of the rocker to the transmission device.

In a further advantageous embodiment of the radio sensor module, the rocker has a weight distribution through which it takes up a rest position within the holder due to gravity. This eliminates the need for a return spring between the holder and the rocker, further simplifying assembly and increasing operational reliability.

This weight distribution can be achieved, for example, in that the rocker includes a battery holder which is positioned accordingly inside the rocker.

In order to safely sense the passage or presence of a material container, the rocker preferably comprises a section with a curved sensing surface, wherein this section protrudes at least partially beyond the holder and thus comes into contact with the material container.

As an alternative to the embodiment with the acceleration sensor, a mechanical switch can be provided on or in the rocker as a sensor for detecting the position, which depending on the angular position of the rocker is actuated by striking an element of the holder. It is also possible to arrange a reed contact inside the rocker as a sensor, which interacts in a contactless manner with a magnet arranged on the holder.

BRIEF DESCRIPTION OF THE DRAWING FIGURES

The invention will be explained in more detail below by reference to embodiment examples, wherein:

FIG. 1 shows an isometric view of a radio sensor module;

FIGS. 2a-c show different views of the radio sensor module according to FIG. 1, arranged on a roller conveyor;

DETAILED DESCRIPTION

Figure 1:
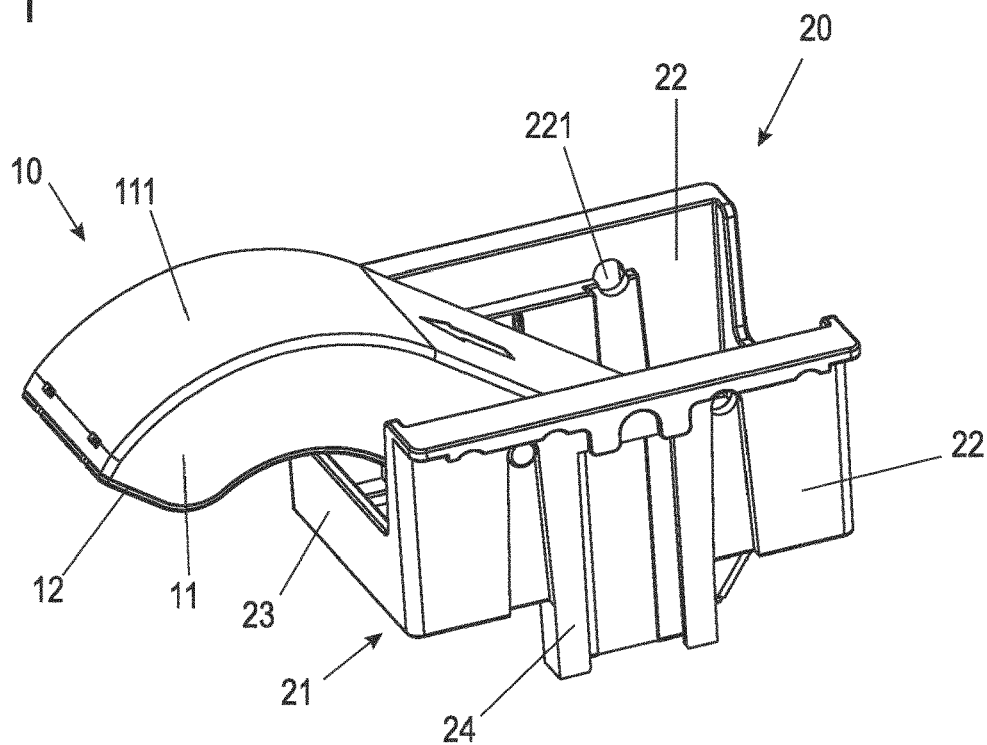

FIG. 1 shows an isometric representation of an embodiment example of a radio sensor module having a rocker 10 pivotably mounted in a holder 20.

The rocker 10 comprises a housing 11, which is closed by a cover 12 on the underside. The inner structure of the rocker 10 is explained in more detail in connection with FIGS. 3 and 4.

The rocker 10 has a cuboid section located in the area of the holder 20. Towards the top and to one side of the holder 20, a curved section of the rocker 10 protrudes, which has approximately the shape of a segment of a cylindrical ring with a rectangular cross-section. On the upper side, the rocker 10 is limited accordingly by a convexly extending section of the housing 11, which forms a scanning surface 111 for a material container.

The rocker 10 can be pivoted around a horizontal pivot axis in the holder 20. The holder 20 is U-shaped, having a horizontally arranged base 21 and two side legs 22. In both side legs 22, opposite bearing points 221 are formed, in which the rocker 10 is pivotably mounted with bearing pins not visible here. The illustrated holder 20 has two pairs of opposite bearing points 221. In the longitudinal direction of holder 20, which is horizontal and perpendicular to the pivot axis, the two pairs of bearing points 221 are arranged off-center in a left and right area of holder 20. The illustrated pairs of bearing points 221 can be used alternatively, depending on the direction in which the rocker 10 is inserted into bearing 20. In the example shown in FIG. 1, the rocker 10 is inserted into the pair of bearing points 221 on the left in the figure and protrudes with the scanning surface 111 to the left beyond the holder 20.

In addition to the base 21, side parts 23 are provided for the holder 20, which connect the two side legs 22 to each other and provide stability to the holder 20. The side parts 23 also represent a stop for the rocker 10. The holder 20 has fastening means 24 for mounting within the storage or transport system.

Figure 2C:
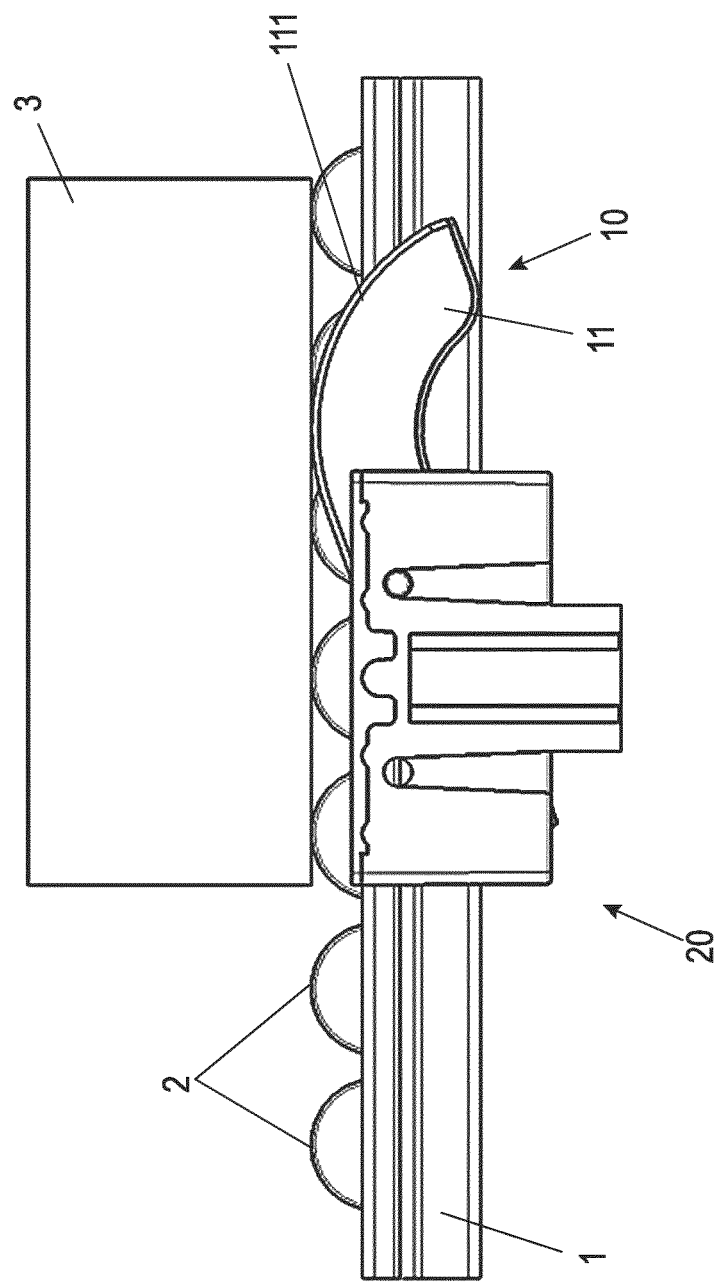

An area of application of the radio sensor module in FIG. 1 is shown in FIG. 2a in an isometric representation and in FIGS. 2b and 2c each in a side view.

In this application example, the radio sensor module is arranged in the area of a roller conveyor 1, wherein the roller conveyor 1 has a plurality of rollers 2 arranged one behind the other on which material containers 3, for example material boxes, can be placed (see FIG. 2c). Usually, at least two such roller conveyors 1 are arranged parallel to each other, wherein the radio sensor module is then preferably mounted between the roller conveyors 1. The material containers can also be transported on only one roller conveyor 1, in which case wider rollers, also known as cylinders, are generally used. A lateral guide for the material containers 3 moving along the roller conveyor 1 can be provided by a guide web on the material container 3, which is guided at the edges of the rollers 2 protruding upwards from the roller conveyor 1. Alternatively, guidance can be provided by additional lateral guide elements which are not shown in FIGS. 2a-c. It should be noted that the arrangement shown in FIGS. 2a-c can also be implemented in a very similar way with slide rails instead of roller conveyors for guiding the material containers.

The radio sensor module is arranged in the area of roller conveyor 1 in such a way that a material container rolling on roller conveyor 1 rolls over holder 20. As FIG. 2b shows in particular, the rocker 10 with the scanning surface 111 projects beyond the height of the rollers 2. As FIG. 2c shows, the material container 3 placed on the rollers 2 pushes the rocker 10 down on its scanning surface 111 and thus pivots it clockwise (with a view on the arrangement according to FIG. 2c).

Once the material container 3 has passed the sensor module or has been removed from the roller conveyor 1, the rocker 10 returns to the position shown in FIG. 2b. The upright position according to FIG. 2b is hereinafter also referred to as the "rest position". The uprighting into the rest position is preferably effected by gravity, which is achieved in such a way that a center of mass of the rocker 10 is not located in the area of the scanning surface 111, but in the part of the rocker 10 beyond the bearing pins, as seen from the scanning surface 111. The position of the rocker 10, which is pivoted from the rest position and is shown in FIG. 2c, is subsequently also referred to as the "switching position" of the rocker 10.

Figure 3:
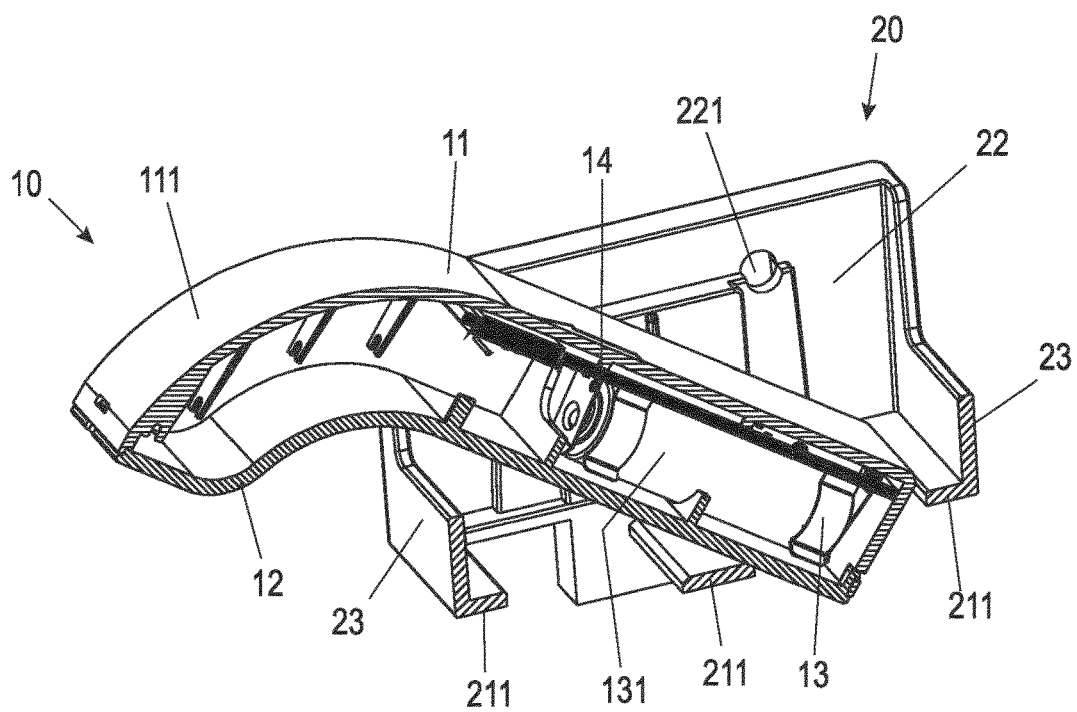
FIG. 3 shows the radio sensor module of FIG. 1 in an isometric sectional view.
Figure 4:
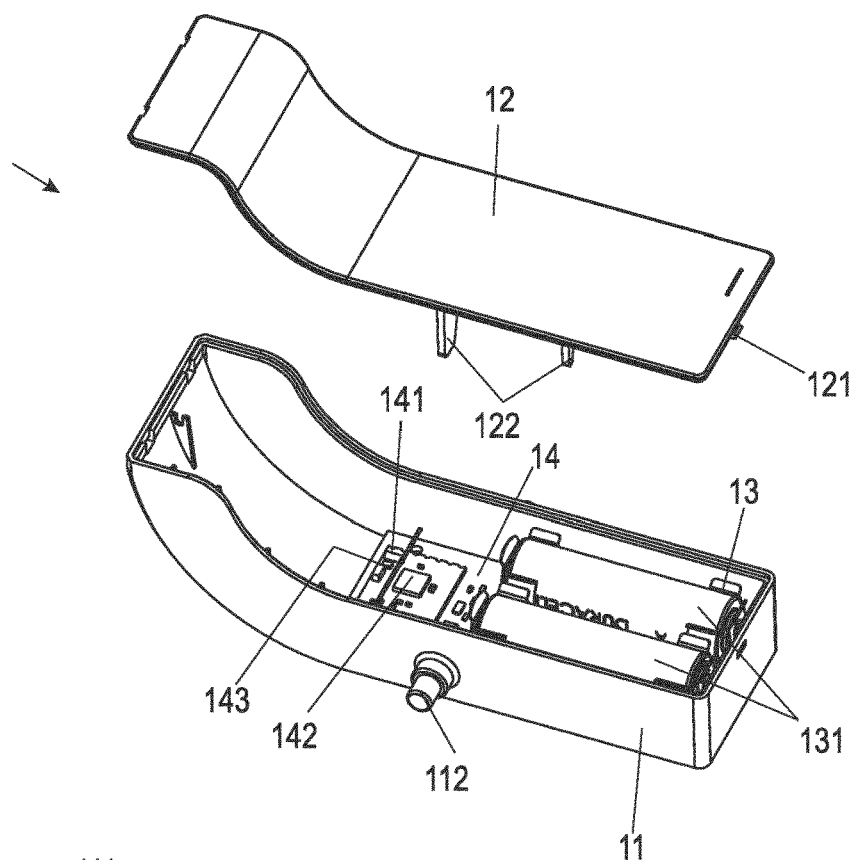
FIG. 4 shows in the open position a rocker of the radio sensor module according to FIG. 1 in an isometric representation.

In connection with FIGS. 3 and 4 it is explained in more detail how the pivoting movement of the rocker 10 is detected in order to detect the passing or presence of the material container 3.

FIG. 3 shows the radio sensor module of FIG. 1 in an isometric sectional view, wherein the section is carried out vertically in a plane perpendicular to the center between the two side legs 22 of the holder 20. FIG. 3 shows the inner structure of the rocker 10 on the one hand and the positioning of the rocker 10 within the holder 20 on the other hand.

The base 21 of holder 20 is formed in a perforated way in the illustrated example. It has webs 211 between which there are openings into which the rocker 10 pivots. In the rest position the rocker 10 is located at one of the webs 211.

FIG. 4 shows the rocker 10 in an isometric representation without the holder 20, wherein the cover 12 is lifted from the housing 11 to reveal the inner structure of the rocker 10. The rocker 10 is shown in FIG. 4 with a view to the underside of the rocker 10, i.e. to the side opposite the scanning surface 111.

A battery holder 13 is arranged in the rocker switch 10, for accommodating, for example, two batteries 131. Furthermore, a circuit board 14 is arranged in the housing 11 of the rocker switch 10, the circuit board 14 accommodating electronic components, in particular an acceleration sensor 141, an evaluation unit 142 and a transmission device 143 for wireless transmission of signals to a receiver not shown here. The transmission device 143 comprises at least one transmitter, preferably in addition a receiver, in order to be able to transmit signals also bidirectionally or to enable handshake procedures during a transmission of data (i.e., digital signals).

The transmission device 143 prefers to use one of the approved frequency bands for the so-called ISM (Industrial, Scientific, Medical) application, for example in the range of 433 MHz (Megahertz), 868 MHz or 2.4 GHz (Gigahertz). A standardized transmission protocol, for example according to the Bluetooth or Zigbee standard, or a proprietary protocol can be used. A protocol that is associated with a low energy requirement is preferred, e.g., Bluetooth-LE (Low Energy), so that the radio sensor module can be supplied by the batteries 131 with a long service life, preferably in the range of several years with one battery set.

In FIG. 4 it is clearly visible that the area of the housing 11, which is located to the right of the bearing pins 112 in this illustration, accommodates the battery holder 13 with the batteries 131, whereas in the area to the left the bearing pin 112 is essentially empty, except for parts of the circuit board 14. This leads to a weight distribution through which the rocker 10 pivots into the rest position within the bearing 20 without the restoring forces of a spring being necessary. Alternatively, additionally, or in certain mounting positions, a spring can be provided to move the rocker 10 into the rest position.

The cover 12 is preferably clipped onto the housing 11. For this purpose, latching means 121 are provided on two or more side edges of the cover 12, which engage in corresponding counter-latching elements of the housing 11.

On the inside of the cover 12 there are retaining webs which, when closing the housing 11 with the cover 12, press on inserted batteries 131 and on the circuit board 14 to hold them in position. For the placement of the circuit board 14, guide elements comparable with the retaining webs 122 are provided in the housing 11. The combination of these guide elements and the retaining web 122 fixes the circuit board 14 and thus also the battery holder 13 in such a way that the circuit board 14 only needs to be inserted into the housing 11. In this way, a defective circuit board 14 can be easily replaced.

According to the application, all mechanical, electromechanical, electrical and/or electronic components used to detect the movement of the rocker 10 and to transmit the information on the movement of the rocker 10 are located in or on the rocker 10 itself. In this way a very simple system is created in which—apart from the bearing of the rocker 10 in the holder 20—no mechanical active connection between the rocker 10 and the holder 20 is necessary.

During installation or maintenance of the radio sensor module, the holder 20 can be easily fixed to the desired position using the fasteners 24 and the rocker 10 can be inserted or replaced. By exchanging the rocker 10 all active components are exchanged so that the functionality of the radio sensor module is immediately restored. The system is accordingly service-friendly.

In the embodiment example shown, the position or angle of the rocker 10 is detected with the aid of the acceleration sensor 141. The acceleration sensor 141 can, for example, be designed as a micro-electromechanical system (MEMS). In this configuration, the 141 accelerometer is space-saving and also available at a reasonable price. Such MEMS acceleration sensors are widely installed in mobile devices such as smartphones or tablet computers and are cost-effective due to the large number of such devices.

Signals of the acceleration sensor 141 are evaluated by the evaluation unit 142, if necessary after preprocessing. Preprocessing may include filtering and/or preamplification. The evaluation unit 142 preferably comprises a microcontroller.

In order to detect a pivoting movement of the rocker 10, an evaluation of the acceleration of the acceleration sensor 141 in one spatial direction would be sufficient. As a rule, available MEMS acceleration sensors are designed to measure and output acceleration values in all three spatial directions. As explained below, acceleration values in directions that are not influenced by a tilting movement of the rocker 10 can be evaluated in a supporting manner to provide additional information about the operating status of the radio sensor module.

The acceleration sensor 141 is able to determine accelerations acting on it by measuring forces acting on a sample mass. The forces on the sample mass are composed of static weight forces and dynamic acceleration forces. In particular, if forces are detected in more than one spatial direction, an angular position of the acceleration sensor 141 relative to the perpendicular (i.e., direction of the gravitational forces) can be determined from the static weight forces. From the known arrangement of the angle sensor 141 within the rocker 10 an angular position of the rocker 10 can be determined.

In addition, any change in the angular position, i.e., pivoting of the rocker 10 when a material hopper is moved or placed thereon, or pivoting back when the material hopper is removed or moved further, is associated with acceleration or deceleration. An evaluation of the signals of the acceleration sensor 141 can include the static weight forces (angular position) and/or the acceleration when changing the angular position (dynamic acceleration forces). Both components (static/dynamic) can be used on their own or preferably in combination to detect the presence of a material container.

The signals (measured values) of the acceleration sensor 141 can be evaluated within the rocker 10. In this case, the position of the rocker 10 is determined in the evaluation unit 142. The transmission device 143 transmits this information as soon as pivoting takes place from the rest position of the rocker 10 to the switching position or back. Alternatively, it is conceivable that a signal representing the position of the rocker 10 is emitted regularly. The first behavior usually requires less energy for transmission, since signals are transmitted less frequently. The second behavior, on the other hand, is more reliable if the arrival of the signals is monitored. A lack of signals then indicates a malfunction of the radio sensor module. The transmission behavior of the radio sensor module is preferably configurable. Such a configuration can, for example, be carried out by means of adjustment options on the rocker 10 itself, for example via miniature switches ("DIP switches") which are soldered onto circuit board 14. Alternatively, a remote configuration can be provided via the transmission device 143 of the rocker 10.

In addition to the above-mentioned evaluation of the signals of the acceleration sensor 141 within the rocker 10 and the transmission of a signal which directly represents a position of the rocker 10 of the radio sensor module, it is alternatively or additionally possible to provide acceleration values measured by the acceleration sensor 141 without further evaluation via the transmission device 143. The acceleration sensor 141 is then evaluated in the area of the receiver of the transmitted signals and thus at a central location. This is particularly advantageous when a large number of radio sensor modules are coupled to a central evaluation unit. The large number of radio sensors does not require their own evaluation logic, which reduces their construction and manufacturing costs. It is also possible to easily adapt evaluation algorithms for a central evaluation for one or all connected radio sensor modules.

Both for local evaluation within the rocker 10 and for remote central evaluation, it is preferred to evaluate static and dynamic accelerations. The dynamic acceleration values can be used, for example, to check the plausibility of the static values. For example, emptying a very light material container (e.g. made of cardboard) piece by piece can cause this container to appear to rise slightly when its base bulges back as a result of the relief. If the presence of the material container is measured exclusively on the basis of the angular position of the rocker 10, the material container could erroneously no longer be detected in this case. By evaluating the dynamic acceleration forces, however, a slow emptying can be easily distinguished from a—compared to this—sudden removal of the material container.

The dynamic acceleration values measured by the acceleration sensor 141 can also be used to determine possible faults within the transport or logistics system. For example, vibrations can be recorded that are compared with threshold values that are considered normal for the system under consideration. Further vibrations indicate falling objects or e.g. problems in the statics of a shelf. Furthermore, a falling of the rocker 10 or the whole radio sensor module can be detected. In particular, acceleration values in spatial directions that are irrelevant for the pivoting movement of the rocker arm 10 can be evaluated to determine fault cases.

As already mentioned, the rocker 10 rests on the holder 20 in the rest position, specifically on the web 211 in the case shown. The orientation of the rocker 10 in the rest position relative to the vertical (i.e., the perpendicular) is thus dependent on the orientation of the holder 20. For example, the holder 20 can be mounted with its upper side parallel to an inclined roller conveyor, so that a different position of the rocker in the rest position results than shown in the example of FIGS. 2*a-c*.

In order to be able to reliably detect a deflection of the rocker 10 relative to the rest position as independently as possible from the exact orientation of the rest position, it may be provided to read in the static acceleration values measured in the rest position by the acceleration sensor 141 and thus calibrate the position of the rocker 10 in the rest position. It can be provided to transmit an appropriate signal via the transmission device 143 to the radio sensor module that the current position of the rocker 10 is calibrated as the rest position. Alternatively, a push-button switch can be arranged on the rocker 10, which triggers the calibration step when actuated manually.

Figure 5:
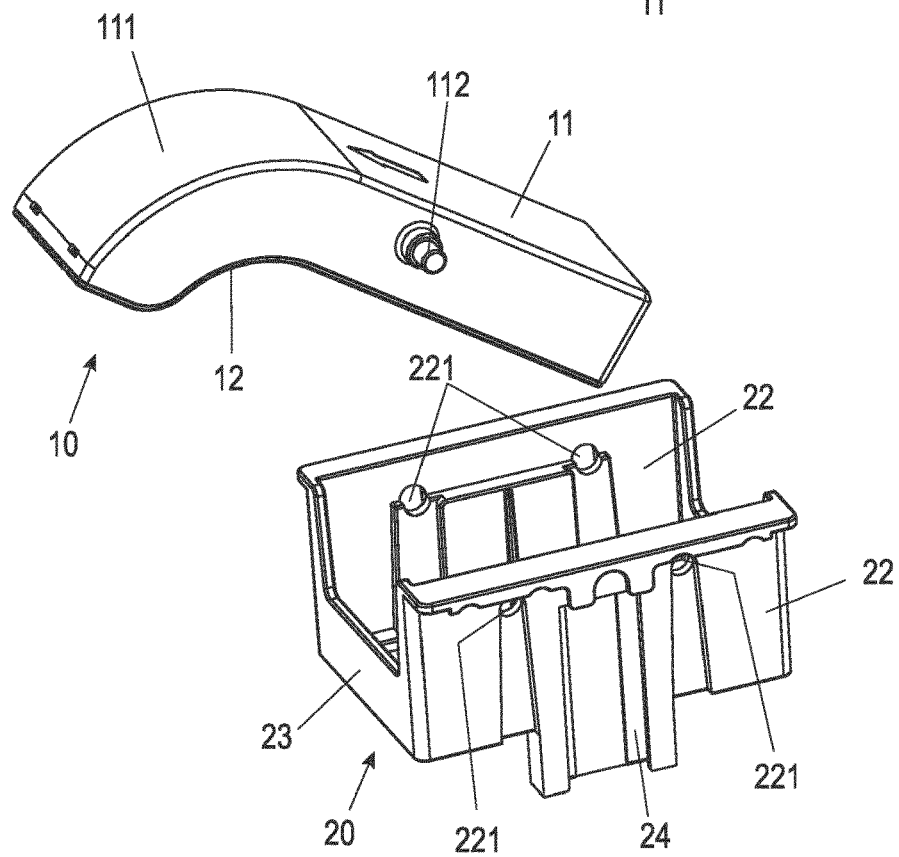
FIG. 5 shows the radio sensor module according to FIG. 1 with rocker or holder shown separately.

FIG. 5 shows the sensor module of FIG. 1 in an isometric representation, wherein the rocker 10 is removed from the holder 20. In this figure, the two alternative bearing points 221 in the holder 20 can be clearly seen. The bearing points 221 are formed by bores in the side legs 22 in which the bearing pins 112 are inserted. The length of the bearing pins 112 is dimensioned so that the side legs 22 of the holder 20 are widened slightly elastically to insert the rocker 10, so that the rocker 10 can be pivoted, but is otherwise fixed in the holder 20. The bearing pins 112 are thickened adjacent to the housing 11, which determines the side position of the rocker 10 within the holder 20 and prevents the rocker 10 from grinding on the side legs 22 of the holder 20.

In the embodiment example described above, the position or movement of the rocker 10 is detected with the aid of the acceleration sensor 141. Alternatively, a mechanical switch can be arranged in or on the rocker as a sensor for detecting the position of the rocker, which, depending on the angular position of the rocker, is actuated by stops on an element of the holder. It is also possible to arrange a reed contact inside the rocker as a sensor, which interacts in a contactless manner with a magnet arranged on the holder.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Roller conveyor
2 Roller
3 Material container
10 Rocker
11 Housing
111 Scanning surface
112 Bearing pin
12 Cover
121 Latching means
122 Retaining web
13 Battery holder
131 Battery
14 Circuit board
141 Acceleration sensor
142 Evaluation unit
143 Transmission device
20 Holder
21 Base
211 Web
212 Opening
22 Side leg
221 Bearing point
23 Side part
24 Fastening means

The invention claimed is:

1. A radio sensor for detecting material containers in a storage or transport system, the radio sensor comprising:
    a transmitter configured to wirelessly transmit signals;
    a holder;
    a rocker pivotably mounted in the holder;
    a first sensor configured to detect a position of the rocker,
        wherein the first sensor and the transmitter are arranged in the rocker.

2. The radio sensor of claim 1, wherein the first sensor is an acceleration sensor.

3. The radio sensor of claim 2, wherein the acceleration sensor is a MEMS sensor.

4. The radio sensor of claim 2, wherein the transmitter is configured to transmit acceleration values measured by the acceleration sensor in at least one spatial direction.

5. The radio sensor of claim 4, further comprising:
an evaluation unit arranged in the rocker, wherein the evaluation unit is configured to evaluate the acceleration values measured by the acceleration sensor.

6. The radio sensor of claim 5, wherein the evaluation unit is connected to the transmitter and is configured to transmit information about a position and/or a change in position of the rocker to the transmitter.

7. The radio sensor of claim 1, wherein the rocker has a weight distribution through which the rocker assumes a rest position within the holder due to gravity.

8. The radio sensor of claim 7, wherein the rocker comprises a battery holder positioned within the rocker such that inserted batteries substantially determine the weight distribution.

9. The radio sensor of claim 1, wherein the rocker comprises a section having a curved scanning surface, wherein the section projects at least partially beyond the holder.

10. The radio sensor of claim 1, wherein the first sensor is a mechanical switch which cooperates with an actuator with the holder.

11. The radio sensor of claim 1, wherein the first sensor is a reed contact that interacts with a magnet attached to the holder.

* * * * *